(12) United States Patent
Tomita et al.

(10) Patent No.: US 8,817,412 B1
(45) Date of Patent: Aug. 26, 2014

(54) MAGNETIC DISK DEVICE AND WRITING METHOD OF A MAGNETIC DISK

(71) Applicant: Kabushiki Kaisha Toshiba, Tokyo (JP)

(72) Inventors: Kazuhiro Tomita, Kanagawa (JP); Naoaki Kawana, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/023,166

(22) Filed: Sep. 10, 2013

(30) Foreign Application Priority Data

Jul. 17, 2013 (JP) .................................. 2013-148483

(51) Int. Cl.
*G11B 21/02* (2006.01)
*G11B 15/12* (2006.01)

(52) U.S. Cl.
CPC ...................................... *G11B 15/12* (2013.01)
USPC .................. 360/75; 360/53; 360/31

(58) Field of Classification Search
USPC ............ 360/75, 53, 31, 69, 78.04, 61, 55, 46, 360/60, 67; 369/47.31, 47.14, 47.55, 30.36, 369/53.13
See application file for complete search history.

(56) References Cited

U.S. PATENT DOCUMENTS

| 5,285,436 | A | | 2/1994 | Moribe |
| 6,046,870 | A | * | 4/2000 | Karube .......................... 360/31 |
| 6,829,206 | B1 | | 12/2004 | Watanabe |
| 7,653,847 | B1 | | 1/2010 | Liikanen et al. |

* cited by examiner

*Primary Examiner* — Ali Neyzari
(74) *Attorney, Agent, or Firm* — Knobbe Martens Olson & Bear LLP (57) ABSTRACT

According to one embodiment, a magnetic disk device includes a first magnetic head corresponding to a first disk surface; a second magnetic head corresponding to a second disk surface; a skip processor which performs skip processing to prevent selection of the second magnetic head when the first magnetic head performs writing; a write data saving unit which selects the second magnetic head based on a result of the detection of ae write environment, and writes write data to the second disk surface through the second magnetic head; and a write data write-back unit which selects the first magnetic head based on a result of the detection of the write environment, and writes the write data written to the second disk surface to the first disk surface through the first magnetic head.

9 Claims, 5 Drawing Sheets

| LBA | SKIP REGION |
|---|---|
| 1000 TO 1050 | 0 TO 100 |
| 5000 TO 5100 | 100 TO 300 |
| ⋮ | ⋮ |

MAGNETIC DISK DEVICE AND WRITING METHOD OF A MAGNETIC DISK

CROSS-REFERENCE TO RELATED APPLICATIONS

This application is based upon and claims the benefit of priority from Japanese Patent Application No. 2013-148483, filed on Jul. 17, 2013; the entire contents of which are incorporated herein by reference.

FIELD

Embodiments described herein relate generally to a magnetic disk device and a writing method of a magnetic disk.

BACKGROUND

Magnetic disk devices may employ magnetic heads larger in number than those required for ensuring a specification capacity, and the heads to be used may be selected, e.g., by a pre-shipment test. For manufacturing a magnetic disk device having a capacity, e.g., of 3 TB, ten magnetic heads and five magnetic disks are mounted on the magnetic disk device, and are adjusted to ensure a surface density per magnetic head equal to 334 GB in average. Nine magnetic heads required for ensuring the capacity of 3 TB are selected by successively selecting the magnetic heads satisfying the device specifications in descending order of capacity. The remaining one magnetic head is skip-processed as a skip head, and will no longer be used.

DETAILED DESCRIPTION

In general, according to one embodiment, a magnetic disk device includes a first magnetic head, a second magnetic head, a skip processor, at least one magnetic disk, a write environment detecting unit, a write data saving unit and a write data write-back unit. The first magnetic head corresponds to a first disk surface. The second magnetic head corresponds to a second disk surface. The skip processor performs skip processing to prevent selection of the second magnetic head when writing is performed by the first magnetic head. The at least one magnetic disk has the first disk surface or the second disk surface. The write environment detecting unit detects write environment being an index indicating whether the writing can be performed stably at the time of writing to the magnetic disk. The write data saving unit, based on a result of the detection of the write environment, writes write data to the second disk surface through the second magnetic head. The write data write-back unit, based on the result of the detection of the write environment, writes the write data written on the second disk surface to the first disk surface through the first magnetic head.

A magnetic disk device and a writing method of a magnetic disk of an embodiment will be described in detail below with reference to the accompanying drawings. These embodiments do not restrict the invention.

First Embodiment

Figure 1:
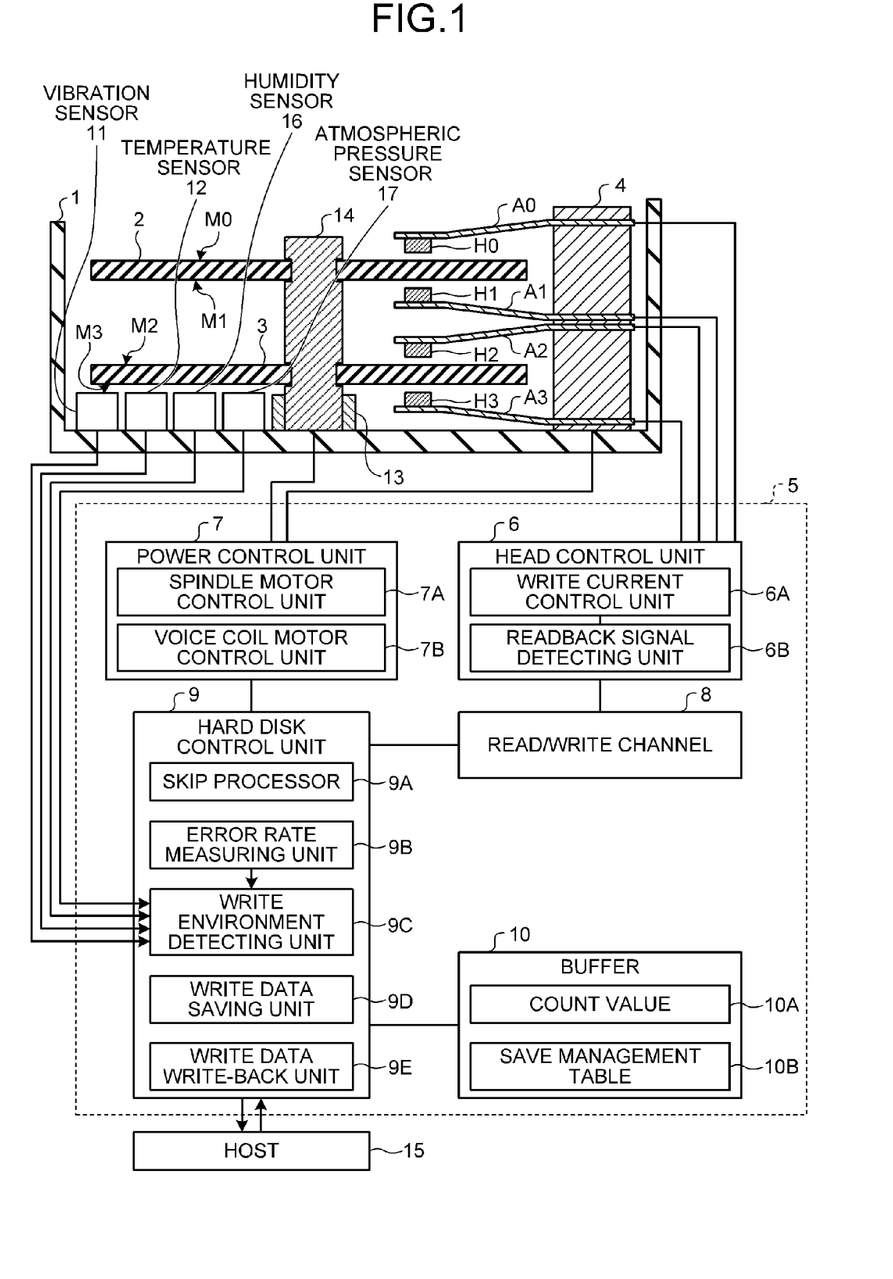
FIG. 1 is a block diagram illustrating a schematic structure of a magnetic disk device according to a first embodiment.

FIG. 1 is a block diagram illustrating a schematic structure of a magnetic disk device according to a first embodiment.

In FIG. 1, the magnetic disk device includes a plurality of magnetic disks 2 and 3. The magnetic disk 2 has disk surfaces M0 and M1 at its opposite surfaces, respectively, and the magnetic disk 3 has disk surfaces M2 and M3 at its opposite surfaces, respectively. The magnetic disks 2 and 3 are integrally supported via a spindle 14.

The magnetic disk device includes magnetic heads H0 to H3 for the respective disk surfaces M0 to M3, and magnetic heads H0 to H3 are opposed to the disk surfaces M0 to M3, respectively. The magnetic heads H0 to H3 are held on the disk surfaces M0 to M3 through arms A0 to A3, respectively. The arms A0 to A3 can slide the magnetic heads H0 to H3 on horizontal planes, respectively. It is assumed that, for reducing the manufacturing cost, the magnetic disk device includes the magnetic heads H0 to H3 larger in number than those required for ensuring a specification capacity. A test before the shipment selects the three magnetic heads H0 to H2 required for ensuring the specification capacity as regular heads, and the remaining one magnetic head H3 is skip-processed as a skip head. The regular heads can be selected in descending order of the capacity from those satisfying the device specifications.

Figure 2A:
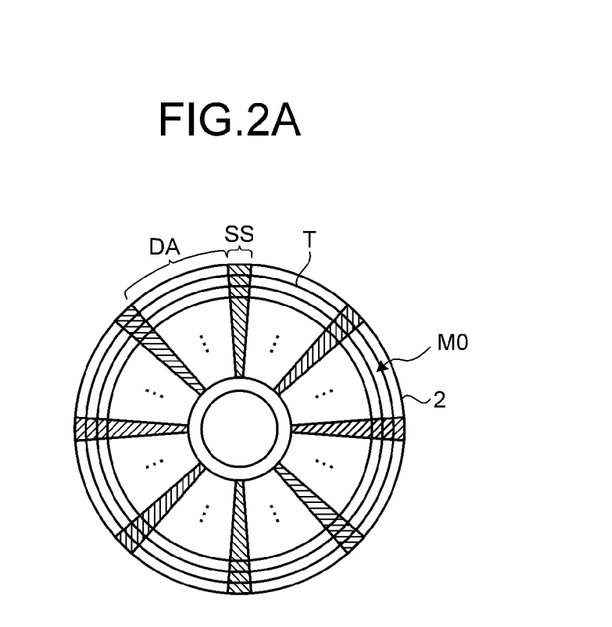
FIG. 2A is a plan view illustrating a track arrangement of the magnetic disk in FIG. 1.

As illustrated in FIG. 2A, circumferential tracks T are arranged, e.g., on the disk surface M0. Each track T has data areas DA for writing user data and servo-areas SS including servo-data. The servo-areas SS are arranged radially, and the data areas DA are located between the servo-areas SS on each track T.

Figure 2B:
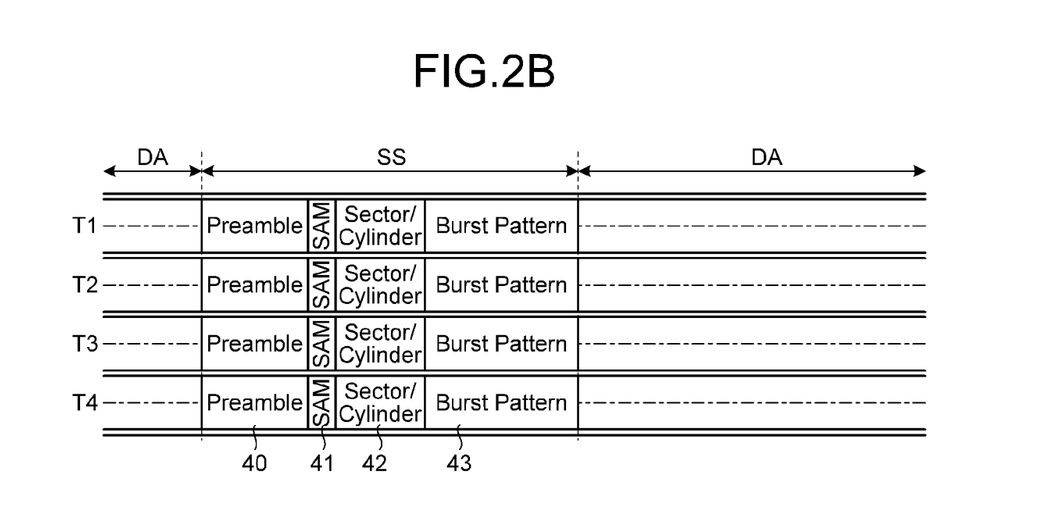
FIG. 2B illustrates a structure example of a servo-area in FIG. 2A.

The servo-area SS includes preambles 40, servo-area marks 41, sector/cylinder information 42 and burst patterns 43 as illustrated in FIG. 2B. The sector/cylinder information 42 can give servo-addresses in the circumferential and radial directions of the disk surface M0, and can be used for seek control that moves the magnetic head H0 to a target track. The burst pattern 43 can be used in tracking control that positions the magnetic head H0 within a target range of a target track. The burst pattern 43 may be of a null type or an area type, or may be of a phase difference type. The disk surfaces M1 to M3 may have the same structure as the disk surface M0.

As shown in FIG. 1, the magnetic disk device includes a voice coil motor 4 driving the arms A0 to A3, and also includes a spindle motor 13 rotating the magnetic disks 2 and 3 through the spindle 14. A casing 1 accommodates the magnetic disks 2 and 3, the magnetic heads H0 to H3, the arms A0 to A3, the voice coil motor 4, the spindle motor 13 and the spindle 14. The casing 1 is provided with a vibration sensor 11 detecting vibrations around the magnetic disks 2 and 3, a temperature sensor 12 detecting a temperature around the magnetic disks 2 and 3, a humidity sensor 16 detecting a humidity around the magnetic disks 2 and 3, and an atmospheric pressure sensor 17 detecting an atmospheric pressure around the magnetic disks 2 and 3. The vibration sensor 11 may be arranged on a circuit board carrying a magnetic record control unit 5. The temperature sensor 12, the humidity sensor 16 and the atmospheric pressure sensor 17 may be arranged on flexible print boards mounted on the arms A0 to A3.

The magnetic disk device includes the magnetic record control unit 5, which includes a head control unit 6, a power control unit 7, a read/write channel 8, a hard disk control unit 9 and a buffer 10. The head control unit 6 includes a write current control unit 6A and a readback signal detecting unit 6B. The power control unit 7 includes a spindle motor control unit 7A and a voice coil motor control unit 7B. The hard disk control unit 9 includes a skip processor 9A, an error rate measuring unit 9B, a write environment detecting unit 9C, a write data saving unit 9D and a write data write-back unit 9E. Firmware executed by the processor achieves processing of the skip processor 9A, the error rate measuring unit 9B, the write environment detecting unit 9C, the write data saving unit 9D and the write data write-back unit 9E.

The head control unit 6 amplifies the signal in the recording/reading operations. The write current control unit 6A controls the write current flowing to the magnetic heads H0 to H3. The readback signal detecting unit 6B detects the signal read by the magnetic heads H0 to H3. The power control unit 7 drives the voice coil motor 4 and the spindle motor 13. The spindle motor control unit 7A controls the rotation of the spindle motor 13. The voice coil motor control unit 7B can control the driving of the voice coil motor 4. The read/write channel 8 converts the signals read by the magnetic heads H0 to H3 into a data format that can be handled by a host 15, and also converts the data outputted from the host 15 into a signal format that allows recording by the magnetic heads H0 to H3. These kinds of format conversion may be DA conversion and encoding. The read/write channel 8 decodes the signals read by the magnetic heads H0 to H3, and performs code modulation on the data outputted from the host 15. The hard disk control unit 9 performs the record/readback control based on the instruction from the host 15, and passes the data between the host 15 and the read/write channel 8. The skip processor 9A performs the skip processing to prevent selection of the magnetic head H3 based on the detection result of the write environment. The error rate measuring unit 9B measures the error rate of the data read from the magnetic disks 2 and 3. The write environment detecting unit 9C detects the write environment at the time of writing to the magnetic disks 2 and 3. The write environment is an index indicating whether the stable writing can be performed or not, and may be, e.g., the vibrations in the magnetic disk device, the temperature, the humidity or the atmospheric pressure. The write data saving unit 9D selects the magnetic head H3, i.e., the skip head based on the detection result of the write environment, and writes the write data through the magnetic head H3 to the disk surface M3. The write data write-back unit 9E selects the magnetic heads H0 to H2 based on the detection result of the write environment, and writes the write data written to the disk surface M3 to the disk surfaces M0 to M2 through the magnetic heads H0 to H2, respectively. The buffer 10 can hold the write command provided from the host 15 as a queue, and can hold management information for managing the write operation. The buffer 10 may be a nonvolatile semiconductor memory such as an NAND flash memory.

The magnetic record control unit 5 is connected to the host 15. The host 15 may be a personal computer issuing the write command, the read command and the like to the magnetic disk device, and may also be an external interface.

When the host 15 issues the write command, the write environment detecting unit 9C detects the write environment. At this time, the write environment detecting unit 9C can determine the write environment based on the vibrations detected by the vibration sensor 11. Alternatively, the write environment detecting unit 9C may be configured to determine the write environment based on the temperature sensed by the temperature sensor 12, the humidity detected by the humidity sensor 16 or the atmospheric pressure detected by the atmospheric pressure sensor 17. When the vibration sensor 11 detects the vibrations exceeding a prescribed value, the write environment detecting unit 9C determines that the write environment is in the predetermined state. Alternatively, the write environment detecting unit 9C may be configured to determine that the write environment is in the predetermined state when the temperature sensor 12 detects the temperature outside a predetermined range (e.g., an extremely high or low temperature environment), the humidity sensor 16 detects the humidity exceeding a prescribed value or the atmospheric pressure sensor 17 detects the atmospheric pressure outside a predetermined range (e.g., an extremely low or high pressure environment).

When the write environment detecting unit 9C determines that the write environment is not in the predetermined state, the skip processor 9A performs the skip processing to prevent selection of the magnetic head H3. While the spindle motor 13 is rotating the magnetic disks 2 and 3, the signals are read through the magnetic heads H0 to H2 from the disk surfaces M0 to M2, respectively, and are detected by the readback signal detecting unit 6B. The signal detected by the readback signal detecting unit 6B is subjected to the data conversion by the read/write channel 8, and then is sent to the hard disk control unit 9. The hard disk control unit 9 performs the tracking control on the magnetic heads H0 to H2 based on the burst pattern 43 included in the signal detected by the readback signal detecting unit 6B. The current positions of the magnetic heads H0 to H2 are calculated based on the sector/cylinder information 42 included in the signal detected by the readback signal detecting unit 6B, and the seek control is performed to move the magnetic heads H0 to H2 closer to the target positions, respectively. Then, the write data is written to the disk surfaces M0 to M2 through the magnetic heads H0 to H2 corresponding to the address specified by the write command, respectively.

On the other hand, when the write environment detecting unit 9C determines that the write environment is in the predetermined state, the write data saving unit 9D selects the magnetic head H3. While the spindle motor 13 is rotating the magnetic disks 2 and 3, the signal is read from the disk surface M3 through the magnetic head H3, and the readback signal detecting unit 6B detects it. The read/write channel 8 performs the data conversion on the signal detected by the readback signal detecting unit 6B, and sends it to the hard disk control unit 9. The hard disk control unit 9 performs the tracking control on the magnetic head H3 based on the burst pattern 43 included in the signal detected by the readback signal detecting unit 6B. The current position of the magnetic head H3 is calculated based on the sector/cylinder information 42 included in the signal detected by the readback signal detecting unit 6B, and the seek control is performed to move the magnetic head H3 closer to the target position. The write data saving unit 9D writes the write data to the disk surface M3 through the magnetic head H3. At this time, the record density may be lowered as compared with the case where the data is written to the disk surfaces M0 to M2 through the magnetic heads H0 to H2, respectively. For lowering the record density, BPI (bit/inch) may be lowered, or TPI (track/inch) may be lowered.

When the write data is written to the disk surface M3 through the magnetic head H3, a count value 10A is incremented by one in response to every write command, and the buffer 10 holds it. A correspondence between the address designated by the write command and the write position on the disk surface M3 is registered in a save management table 10B, and the buffer 10 holds it.

Figure 3:
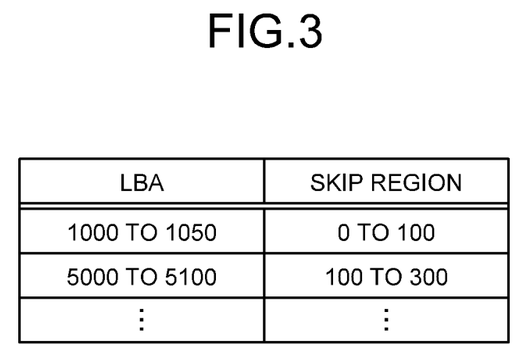
FIG. 3 illustrates a structure example of a save management table of the magnetic disk device in FIG. 1.

FIG. 3 illustrates a structure example of the save management table of the magnetic disk device in FIG. 1.

In FIG. 3, the LBAs (Logical Block Addresses) designated by the write command are assigned to the disk surfaces M0 to M2, and the skip region for writing through the magnetic head H3 is assigned to the disk surface M3. When the write command designates the LBA, the address of the skip region corresponding to the LBA can be registered in the save management table 10B. A physical address on the disk surface M3 may be applied to the address of the skip region.

In FIG. 1, in the state where the count value 10A is one or more, and new commands (including the write command and the read command) have not been issued for a predetermined time, when the write environment detecting unit 9C determines that the write environment is not in the predetermined state, the write data write-back unit 9E selects the magnetic heads H0 to H2. The write data written to the disk surface M3 is written to the disk surfaces M0 to M2 through the respective magnetic heads H0 to H2. At this time, reference is made to the save management table 10B, and the write data written to the skip region on the disk surface M3 is written to the regions of the LBAs on the respective disk surfaces M0 to M2 designated by the write command. Also, the count value 10A is decremented by one. When a new command is issued while the write data written to the disk surface M3 is being written to the disk surfaces M0 to M2 through the respective magnetic heads H0 to H2, it is possible to interrupt this write-back operation and to start the write-back operation from the start at the next occasion.

The count value 10A and the save management table 10B are preferably recorded from the buffer 10 to the nonvolatile record region (e.g., the magnetic disks 2 and 3) during the idle state where the processing for the write or read command is not being executed. Also, after the power-on of the magnetic disk device, the previous information can be restored by reading the count value 10A and the save management table 10B into the buffer 10. Also, the count value 10A is referred to at the time of the power-on of the magnetic disk device. When the count value 10A is one or more, the reference is made to the save management table 10B to read and change the address.

Figure 4:
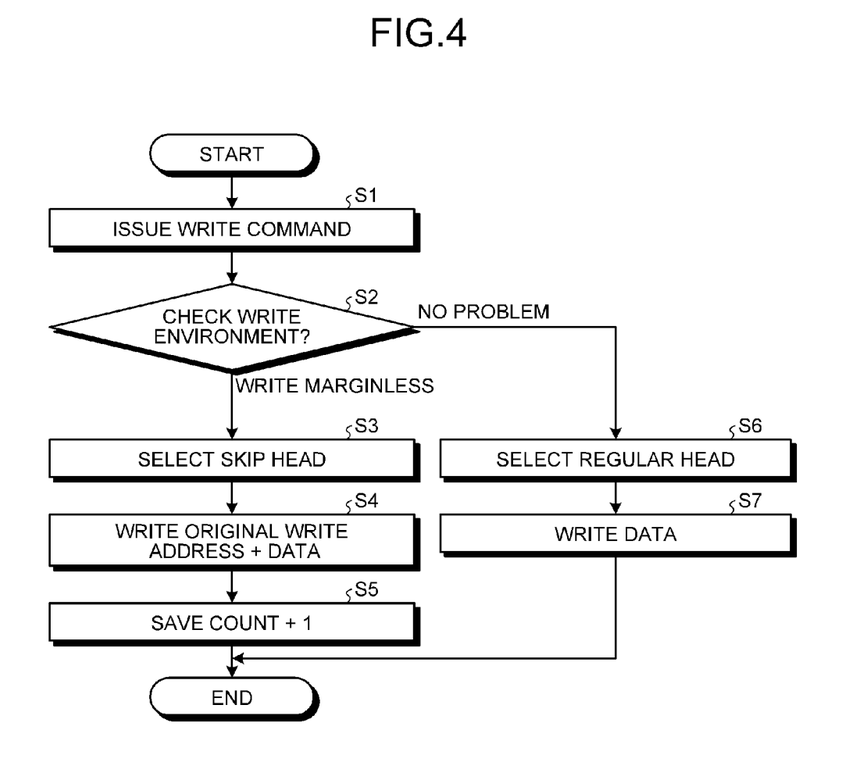
FIG. 4 is a flowchart illustrating a saving operation of the magnetic disk device of the first embodiment.

FIG. 4 is a flowchart illustrating the saving operation of the magnetic disk device of the first embodiment.

In FIG. 4, when the host 15 issues the write command (S1), the write environment is checked. It is determined from a result of checking the write environment whether a predetermined write margin is present or not (S2). When the predetermined write margin is present ("No problem" in S2), the magnetic heads H0 to H2 are selected as the regular heads (S6), and the write data is written to the disk surfaces M0 to M2 through the magnetic heads H0 to H2, respectively (S7).

On the other hand, when the predetermined write margin is not present ("Write marginless" in S2), the magnetic head H3 is selected as the skip head (S3), and the write data is written as the saved data to the disk surface M3 through the magnetic head H3. Also, the correspondence between the address for originally writing the data and the write position of the saved data is registered in the save management table 10B (S4). Simultaneously, the count value 10A (which may also be referred to as the "save count" hereinafter) of the buffer 10 in FIG. 1 is incremented by one, and the presence of the saved data is recorded (S5).

Figure 5:
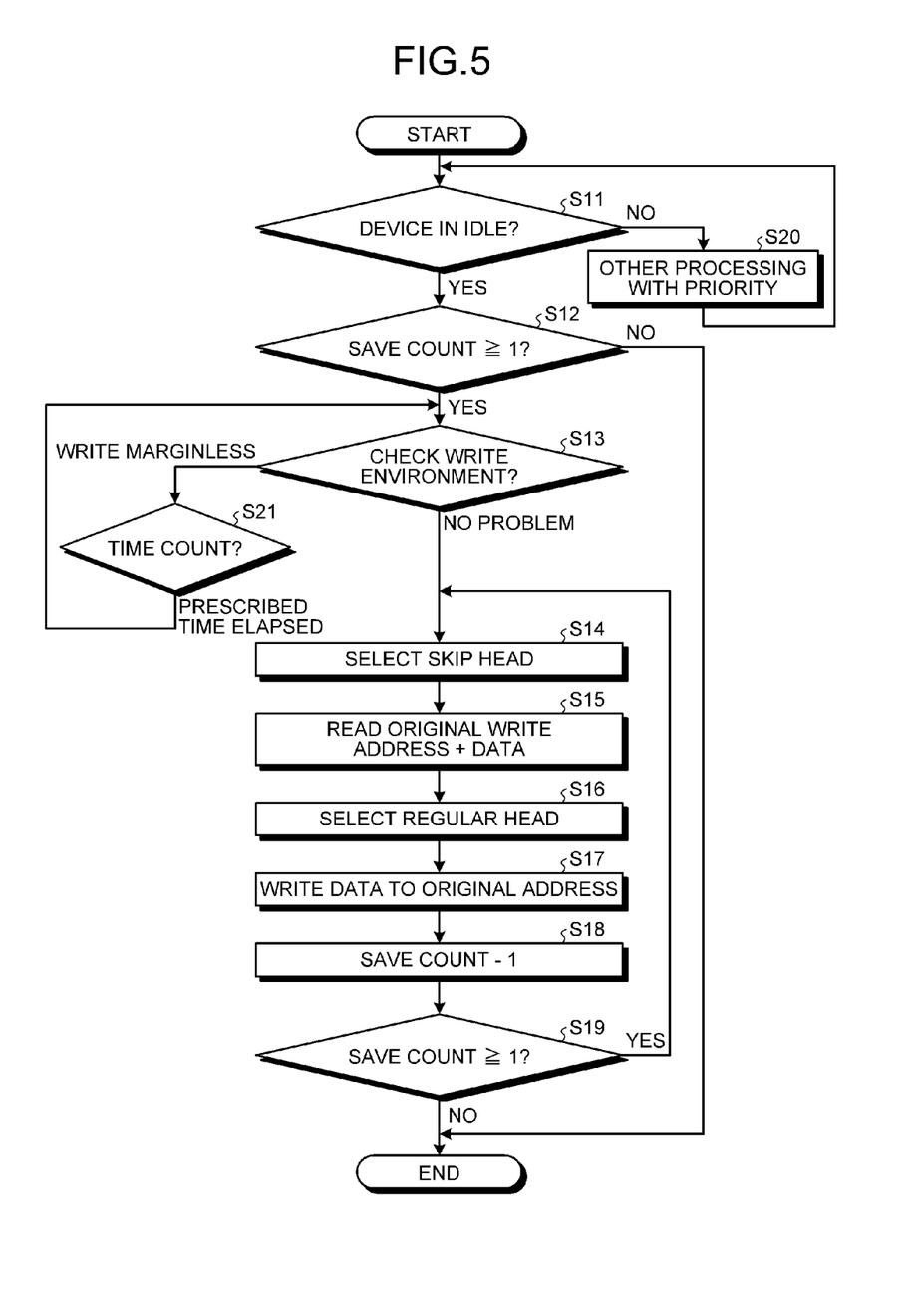
FIG. 5 is a flow chart illustrating a write-back operation of the magnetic disk device of the first embodiment.

FIG. 5 is a flow chart illustrating the write-back operation of the magnetic disk device of the first embodiment.

In FIG. 5, it is determined whether the magnetic disk device is idle or not (S11). When the magnetic disk device is not idle (No in S11), processing other than the write-back operation is performed with priority (S20). On the other hand, when the magnetic disk device is idle (Yes in S11), it is determined whether the save count is one or more, or not (S12). When the save count is not one or more at this time (No in S12), the write-back processing ends. On the other hand, when the save count is one or more (Yes in S12), the write environment is checked (S13). It is determined from the result of checking the write environment whether a predetermined write margin is present or not. When the predetermined write margin is not present ("Write marginless" in S13), time counting is performed (S21). When a prescribed time elapses as a result of the time counting, the processing returns to S13, and checks the write environment. When the predetermined write margin is not present as a result of checking the write environment, the processing in S13 and S21 is repeated. When it is determined from a result of checking the write environment that there is no problem ("No problem" in S13), the magnetic head H3 is selected as the skip head (S14). By referring to the save management table 10B, the write position of the saved data corresponding to the address of the original writing is obtained, and the saved data is read from the disk surface M3 through the magnetic head H3 (S15).

The saved data is read through the magnetic head H3, the magnetic heads H0 to H2 are selected as the regular heads (S16) and the saved data is written to the addresses of the original writing on the disk surfaces M0 to M2 through the magnetic heads H0 to H2, respectively (S17). Simultaneously, the save count is incremented by one (S18), and it is determined whether the save count is one or more, or not (S19). When the save count is one or more (Yes in S19), the processing through S14 to S19 is repeated until the save count becomes zero (No in S19). For writing back the saved data written to the disk surface M3 to the disk surfaces M0 to M2, the saved data may be written through the magnetic heads H0 to H2 while reading the saved data through the magnetic head H3. Also, the buffer 10 may temporarily store the saved data read through the magnetic head H3, and the saved data may be written through the magnetic heads H0 to H2 while reading the saved data from the buffer 10.

According to the embodiment, when the write environment was bad, the write data could be saved through the skip head, and the saved write data can be rewritten to the original position when the write environment is good. Therefore, lowering of the write margin can be suppressed when the write environment is bad, and the lowering of the write quality can be suppressed. As a result, the data read error due to the lowering of the write quality and delay of the write operation due to a write fault can be avoided, and the write performance can be improved.

Second Embodiment

The first embodiment has been described in connection with the method in which the write environment detecting unit 9C determines the write environment based on the vibrations detected by the vibration sensor 11 or the temperature detected by the temperature sensor 12. However, the write environment may be determined based on the read/write characteristics after the start of the magnetic disks 2 and 3.

More specifically, when the host 15 issues the write command immediately after the start (start of rotation) of the magnetic disks 2 and 3, as is done, e.g., after the power-on (start) of the magnetic disk device or after the return from the standby state, the error rate measuring unit 9B measures the error rate of the data read from the magnetic disks 2 and 3. The check data for measuring the error rate may be written in advance to the disk surfaces M0 to M2. The write environment detecting unit 9C can determine the write environment based on the error rate measured by the error rate measuring unit 9B. When the error rate measured by the error rate measuring unit 9B does not exceed a prescribed value, the write environment detecting unit 9C determines that the write environment is in the predetermined state. This operation can be performed prior to the write processing at the time of issuing the write command. At the power-on start of the magnetic disks 2 and 3, the count value 10A is referred to. When the count value 10A is one or more, the save management table 10B is referred to, and the reading and changing of the address are performed.

After the start of the magnetic disks 2 and 3, the read/write characteristics may deteriorate in the following phenomena.

(1) After the low-temperature start (i.e., immediately after the start from the state in which a power-off state or an unloaded state was kept for a predetermined time), a lubricant or the like of the magnetic disks 2 and 3 has adhered to the magnetic heads H0 to H3 so that floating positions of the magnetic heads H to H3 rise.

(2) The magnetic disk device is in a transition state (unsteady state) as is done immediately after the start of the rotation of the magnetic disks 2 and 3.

The embodiments have been described in connection with the examples of the magnetic disk devices each having the two magnetic disks 2 and 3 as well as the four magnetic heads H0 to H3. However, the number of the magnetic disks is not restricted, provided it is at least one, and the number of the magnetic heads is not restricted, provided it is at least two.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a first magnetic head corresponding to a first disk surface;
    a second magnetic head corresponding to a second disk surface;
    a skip processor which performs skip processing to prevent selection of the second magnetic head when writing is performed by the first magnetic head;
    at least one magnetic disk having the first disk surface or the second disk surface;
    a vibration sensor which detects vibrations around the magnetic disk;
    a temperature sensor which detects a temperature around the magnetic disk;
    an error rate measuring unit which measures an error rate of data read from the magnetic disk;
    a write environment detecting unit which detects a write environment being an index of whether the writing can be performed stably or not when the writing to the magnetic disk is performed, based on at least one of the vibration, the temperature and the error rate;
    a write data saving unit which selects the second magnetic head, and writes write data to the second disk surface through the second magnetic head by lowering a recording density as compared with the case of writing to the first disk surface through the first magnetic head, when the write environment is in a predetermined state; and
    a write data write-back unit which selects the first magnetic head, and writes the write data written on the second disk surface to the first disk surface through the first magnetic head, when the write environment is not in the predetermined state.

2. A magnetic disk device comprising:
    a first magnetic head corresponding to a first disk surface;
    a second magnetic head corresponding to a second disk surface;
    a skip processor which performs skip processing to prevent selection of the second magnetic head when writing is performed by the first magnetic head;
    at least one magnetic disk having the first disk surface or the second disk surface;
    a write environment detecting unit which detects a write environment being an index of whether the writing can be performed stably or not when the writing to the magnetic disk is performed;
    a write data saving unit which, based on a result of the detection of the write environment, writes write data to the second disk surface through the second magnetic head; and
    a write data write-back unit which, based on the result of the detection of the write environment, writes the write data written on the second disk surface to the first disk surface through the first magnetic head.

3. The magnetic disk device of claim 2, wherein
the write data saving unit writes the write data to the second disk surface through the second magnetic head by lowering a recording density as compared with the case of writing to the first disk surface through the first magnetic head.

4. The magnetic disk device of claim 2, wherein
the write environment is a vibration around the magnetic disk, a temperature around the magnetic disk or a read/write characteristic after starting of the magnetic disk.

5. The magnetic disk device of claim 3, wherein
the write environment is a vibration around the magnetic disk, a temperature around the magnetic disk or a read/write characteristic after starting of the magnetic disk.

6. A writing method of a magnetic disk performing skip processing to prevent selection of a second magnetic head corresponding to a second disk surface of at least one magnetic disk when writing is performed by a first magnetic head corresponding to a first disk surface of the magnetic disk, the method comprising:
    writing write data to the second disk surface through the second magnetic head based on a result of detection of a write environment being an index of whether the writing can be performed stably or not when the writing to the magnetic disk is performed; and
    writing the write data written on the second disk surface to the first disk surface through the first magnetic head based on the result of the detection of the write environment.

7. The method of claim 6, wherein
writing of the write data to the second disk surface through the second magnetic head is performed by lowering a recording density as compared with the case of writing to the first disk surface through the first magnetic head.

8. The method of claim 6, wherein
the write environment is a vibration around the magnetic disk, a temperature around the magnetic disk or a read/write characteristic after starting of the magnetic disk.

9. The method of claim 7, wherein
the write environment is a vibration around the magnetic disk, a temperature around the magnetic disk or a read/write characteristic after starting of the magnetic disk.

* * * * *